A. HOWES.
SHOCK ABSORBER FOR MOTOR VEHICLES.
APPLICATION FILED AUG. 4, 1920.
1,385,551. Patented July 26, 1921.
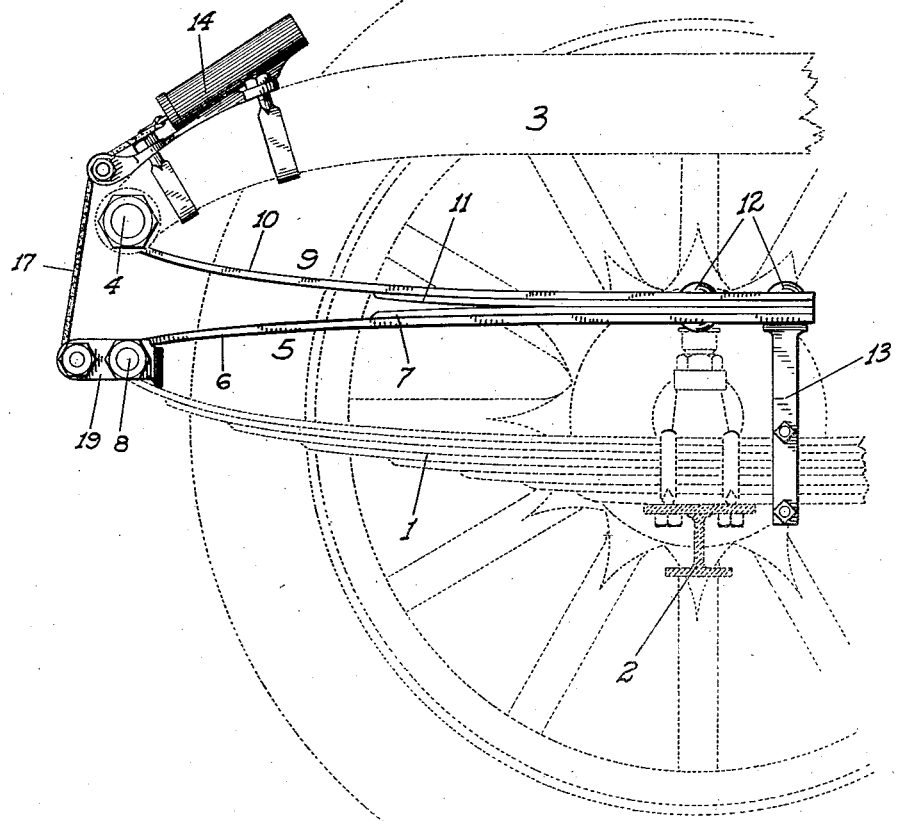
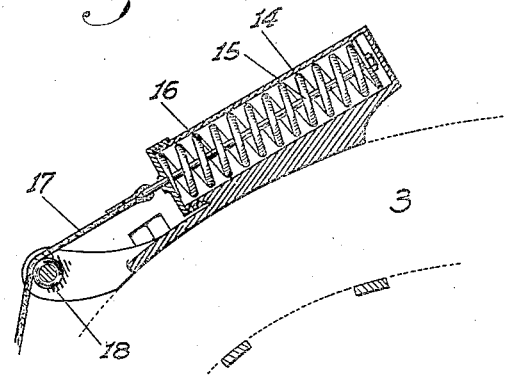
INVENTOR.
Albert Howes
BY
ATTORNEY

UNITED STATES PATENT OFFICE.

ALBERT HOWES, OF SANTA CRUZ, CALIFORNIA.

SHOCK-ABSORBER FOR MOTOR-VEHICLES.

1,385,551.  Specification of Letters Patent.  Patented July 26, 1921.

Application filed August 4, 1920. Serial No. 401,092.

*To all whom it may concern:*

Be it known that I, ALBERT HOWES, a citizen of the United States of America, residing at Santa Cruz, county of Santa Cruz, State of California, have invented certain new and useful Improvements in Shock-Absorbers for Motor-Vehicles; and I do declare the following to be a full, clear, and exact description of the same, reference being had to the accompanying drawings and to the characters of reference marked thereon, which form a part of this application.

This invention relates to shock absorbers for motor vehicles, the principal object being to provide a means, installed in connection and coöperating with either the front or rear springs of the vehicle, whereby a very slow and easy absorbing action is had which will be entirely free from jerky motions.

The application of my shock absorbers to a car therefore make for a very easy riding vehicle.

Another object is to provide a means for taking care of and absorbing the shock of the upthrow or rebound of the frame relative to the frame, such as occurs after the wheels strike a decided bump or depression.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is an elevation in outline of a wheel spring and the adjacent car frame, showing the installation of my improved absorber in connection therewith.

Fig. 2 is an enlarged sectional view of a spring cushioning member.

Referring now more particularly to the characters of reference on the drawings, the numeral 1 denotes one of the main springs of the axle 2 and 3 the car frame thereabove, these being on the front end of the car.

The forward eye of the spring is usually connected direct to the forward end of the frame 3 by means of the pin or bolt 4.

In order to install my shock absorber however, the spring is disconnected from the frame at this end.

The absorber itself consists of a lower spring-leaf member 5, preferably consisting of two leaves 6 and 7, the lower leaf 6 being considerably longer than the upper leaf 7 and being connected direct to the forward eye of the main spring 1 by means of a common pin or bolt 8.

The spring member 5 is curved opposite to the curvature of the spring 1, and of course is directly thereabove.

Above the spring 5 is another spring member 9, curved in the opposite direction thereto and consisting of upper and lower leaves 10 and 11, the upper of said leaves being considerably longer than the lower leaf and being connected direct to the forward end of the frame 3 by means of the pin 4.

The spring members 5 and 9 converge to rest against each other at their rear ends, which is at a point somewhat to the rear of the axle 2, so that each spring member is substantially of the form of a quarter-ellipse.

Such rear ends are secured together as by rivets 12, the rearmost of such rivets being also connected to a support 13 on which the ends of the absorber rest, this support being clamped to the spring 1, the height of the support being preferably such that the rear portions of the absorber-springs are maintained in a vertical plane midway between the pin 4 of the frame 3 and the pin 8 of the main spring 1.

The shock of coming together of the frame and main spring is therefore absorbed in a slow and smooth manner by this absorber structure, owing to its relatively great length.

To absorb or cushion the shock had when the frame and main spring move apart farther than their normal spacing, in which case the absorber springs 5 and 9 do not function, I provide a cylinder 14 mounted on the frame 1, and having a compression spring 15 therein normally at rest.

A rod 16 projects from the cylinder, toward the front end of the frame, being secured to the farther end of the spring 15. To the outer end of this rod is secured one end of a strong but flexible band 17 which passes over a roller 18 mounted on the frame, and is fixed at its lower end to a rigid link or connection 19 secured to the pin 8.

Thus when the frame and main spring come together, the strap 17 is merely slackened, but when the frame and spring move apart beyond their normal spacing, the strap becomes in tension, and pulls the rod 16, compressing the spring 15 and thus absorbing the shock and providing a cushioning effect, the combination of the two oppositely functioning spring shock absorbers together insuring a very easy riding car, and one whose chassis will be free of heavy and injurious jars and vibration.

From the foregoing description it will be readily seen that I have produced such a device as substantially fulfils the objects of the invention as set forth herein.

While this specification sets forth in detail the present and preferred construction of the device, still in practice such deviations from such detail may be resorted to and do not form a departure from the spirit of the invention, as defined by the appended claims.

Having thus described my invention, what I claim as new and useful and desire to secure by Letters Patent is:

1. A shock absorber for motor vehicles comprising a pair of oppositely disposed leaf springs positioned between the frame and the main spring of an axle of the vehicle, the inner ends of said spring being adjacent each other and secured in common to the main spring at a point intermediate its ends, and the outer ends converging from each other and secured to the end of the frame and to the corresponding end of the main spring respectively, said frame and main spring being disconnected and separated from each other at such end.

2. A shock absorber for motor vehicles comprising in combination with the frame and main spring of an axle of the vehicle, said spring being disconnected from the frame at the outer end thereof and spaced therefrom, a leaf spring secured to the frame end and extending beyond the axle substantially parallel to the main spring, a second leaf spring connected to the outer end of the main spring and positioned in reverse relation to the first named spring, said springs converging together to lie one on the other at their inner ends, and a support fixed to the main spring and on which such inner spring-ends bear and are secured.

In testimony whereof I affix my signature in presence of two witnesses.

ALBERT HOWES.

Witnesses:
 ERVIN L. LEACH,
 NELL. S. MOLIERE.